United States Patent [19]

Bar

[11] Patent Number: 4,492,886

[45] Date of Patent: Jan. 8, 1985

[54] STARTING RELAY-TERMINAL BOX GROUP FOR HERMETIC MOTOR-DRIVEN COMPRESSORS

[75] Inventor: Alfredo Bar, Pavia, Italy

[73] Assignee: Necchi Societá per Azioni, Pavia, Italy

[21] Appl. No.: 400,010

[22] Filed: Jul. 20, 1982

[30] Foreign Application Priority Data

Sep. 3, 1981 [IT] Italy .............................. 42916 A/81

[51] Int. Cl.³ ............................................ H02K 11/00

[52] U.S. Cl. ..................................... 310/68 C; 310/71

[58] Field of Search ................................ 310/68 C, 71

[56] References Cited

U.S. PATENT DOCUMENTS 4,042,860 8/1977 Woods et al. ................ 310/68 C X
4,177,396 12/1979 Wang ............................... 310/68 C
4,205,246 5/1980 Wise et al. ........................ 310/68 C
4,236,092 11/1980 DiFlora ............................ 310/68 C

*Primary Examiner*—Donovan F. Duggan
*Attorney, Agent, or Firm*—Stevens, Davis, Miller & Mosher

[57] ABSTRACT

A starting relay-terminal box group for hermetic motor-driven compressors applied to cooling apparatuses, composed of a base surface secured to the outer part of the container of the motor-driven compressor, a fixed cover covering a portion of the surface and forming with it a space of limited height inside which is fitted the starting relay consisting of a positive temperature coefficient resistance (PTCR) and a removable cover covering the remaining portion of the base surface and forming with it a space, also of limited height, inside which the terminal box is fitted.

1 Claim, 3 Drawing Figures

STARTING RELAY-TERMINAL BOX GROUP FOR HERMETIC MOTOR-DRIVEN COMPRESSORS

The present invention relates to a starting relay-terminal box group for hermetic motor-driven compressors.

Groups of such kind have already been developed for the purpose of creating a compact complex composed of a positive temperature coefficient resistance starting relay (PTCR) and of a terminal box for application to the outer part of the container of the motor-driven compressor, with the expedient of pre-setting the terminals of the supply cables in a convenient and frontal position vis-a-vis the operator who has, in the case of any eventuality, to connect and disconnect the supply wires coming from the main network.

The subject matter of the invention is a novel structure of a group of the aforesaid type having dimensions reduced to a minimum but despite this preserving the functional characteristics and the advantages of the embodiments already known in the art.

The reduction of the dimensions of the PTCR-terminal box group has the dual advantage of decreasing the space occupied for fitting the motor-driven compressor into the housing provided for the purpose in the rear lower part of the cooling cabinet and thus of increasing the interior space thereof set aside for victuals, and it also provides the further advantage of lowering the costs of manufacture of the group, which is of minimal size and structurally uncomplicated.

The new embodiment forming subject matter of the present invention is characterized by the fact that the starting relay-terminal box group is composed of a base surface, secured to the outer part of the container for the motor-driven compressor, a fixed cover covering a portion of the surface and forming with it a space of limited height inside of which is housed the starting relay consisting of a positive temperature coefficient resistance (PTCR) and a removable cover covering the remaining portion of the base surface and forming with it a space, also of limited height, inside of which the terminal box is accomodated.

Further advantages and characteristics will be found in the following description of a preferred embodiment of the invention, and in the attached drawings, in which.

Figure 1:
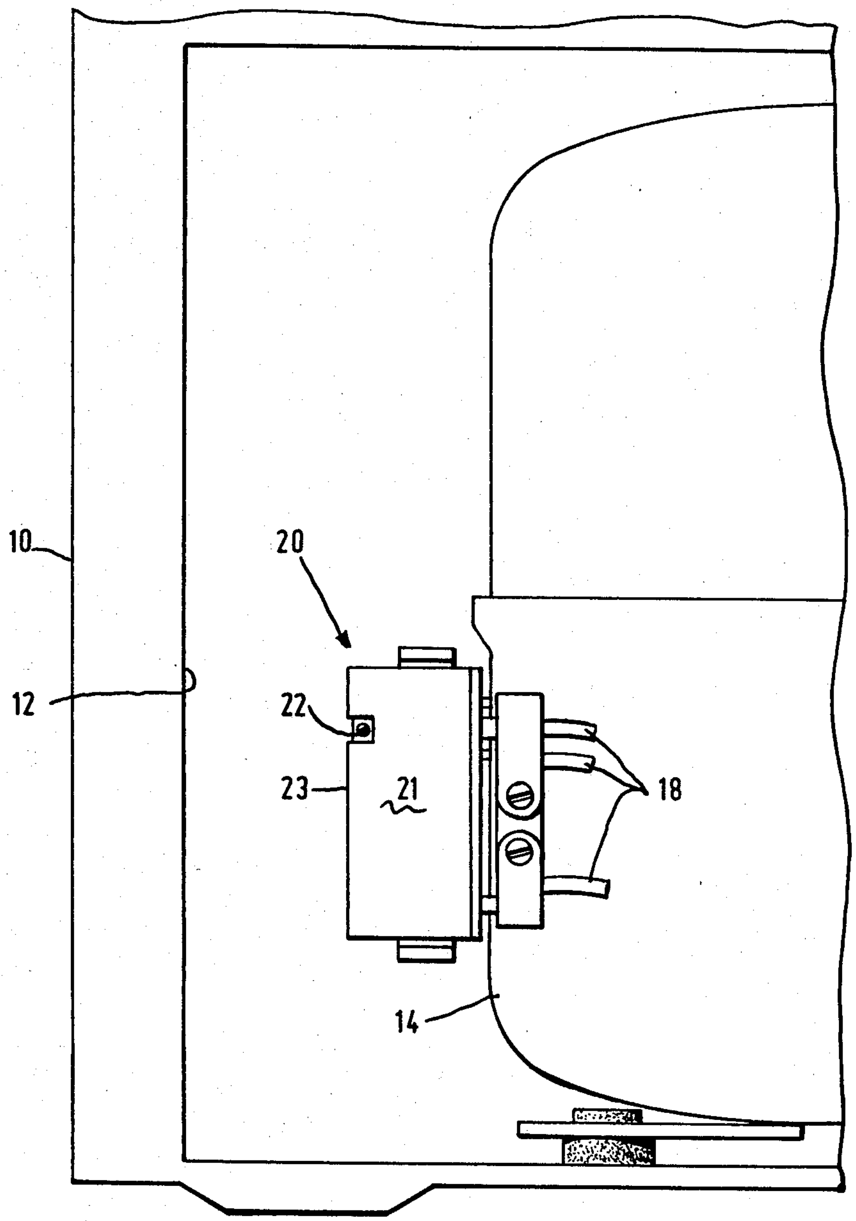
FIG. 1 illustrates the PTCR and terminal box group as mounted on the motor-driven compressor.

With reference to FIG. 1, the numeral 10 identifies the cooling cabinet in the rear lower part of which a compartment 12 is formed on the base of which is housed the container 14 of the motor-driven compressor.

Laterally, on the lower part of the container is secured the starting relay-terminal box group 16 forming subject matter of the invention.

To the group are fixed the electric cables 18 coming from the mains network and the conductors connecting the electrical parts of the motor-driven compressor.

A cover 20 (FIG. 3) closes the group 16 and is fixed thereto by the screw 22.

Figure 2:
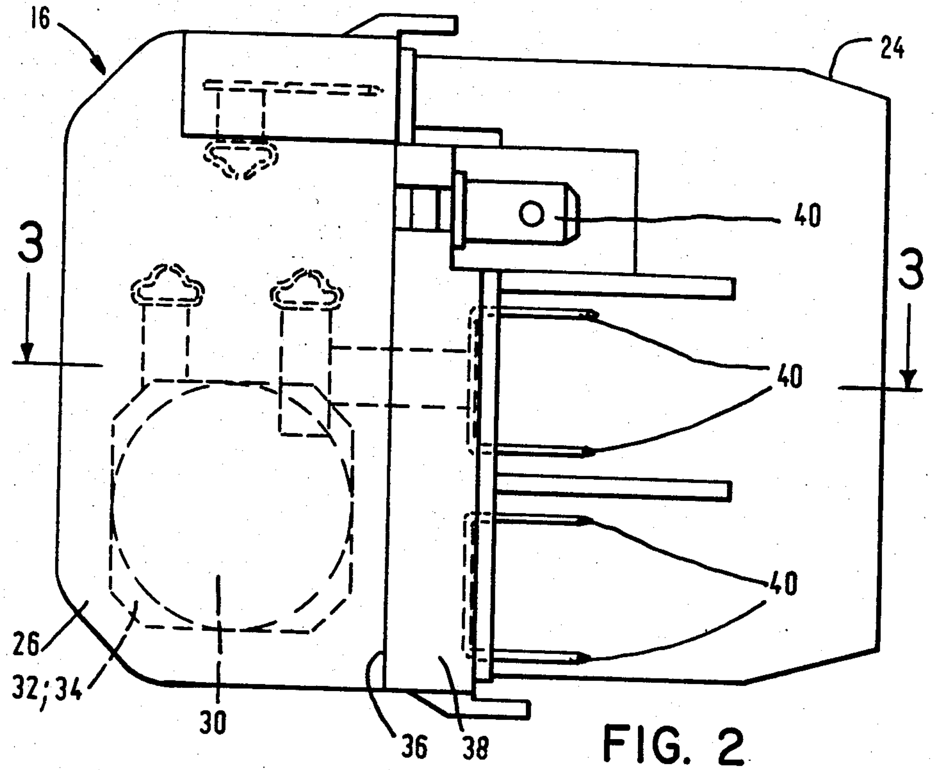
FIG. 2 illustrates a detailed view of the group of FIG. 1.
Figure 3:
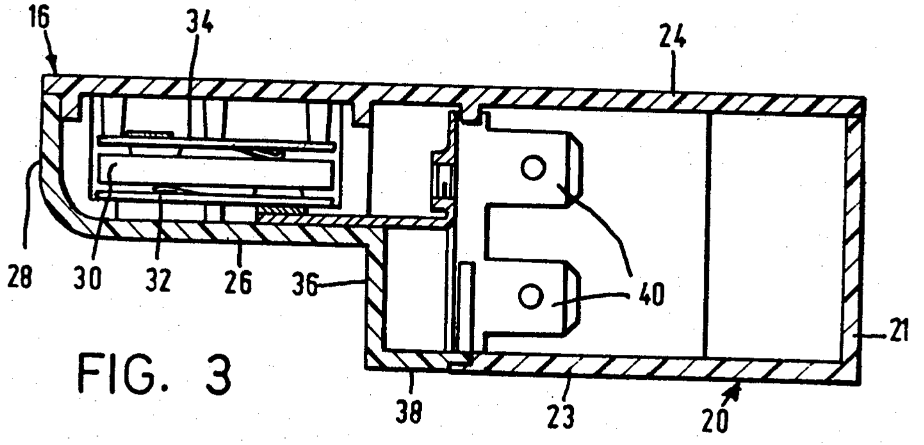
FIG. 3 is a section, in the direction of the line 3—3, of the group illustrated in FIG. 2.

With reference to FIGS. 2 and 3, the starting-relay-terminal box group has a base surface 24 of substantially rectangular shape closed on one side by an upper parallel surface 26 connected to the base surface 24 by a vertical wall 28. The height of the portion of the PTCR box composed of the surfaces 24, 26 and 28 is very limited. The portion contains the PTCR stud 30 closed between the conductor plates 32, 34.

Provision is made in the group 16 for a wall 36, perpendicular to the surface 26 of the PTCR box which defines with the base surface 24 and the cover 20 the portion of the group 16 which will form the terminal box.

The cover 20 has an angular shape and frontally and laterally closes the terminal box by its surfaces 21 and 23 respectively, which are positioned perpendicularly one to the other.

The lateral wall 23 of the cover 20 is coupled to the terminal part of a wall 38 forming a single body with the walls 36, 26 and 28.

A series of "faston" connectors 40 are mounted on the base surface 24 so as to be in an easily accessible position for an operator working behind the cooling cabinet 10.

When the supply cable has to be replaced, it is sufficient to unscrew the screw 22, remove the cover 20 and connect up the cables.

What is claimed is:

1. Starting relay-terminal box for hermetic motor-driven compressors for cooling apparatuses, comprising a base surface securable to the wall of the motor-driven compressor, a fixed cover covering a portion of said surface and forming with it a space of limited height inside, a starting relay positioned within said space consisting of a positive temperature coefficient resistance (PTCR), a removable cover covering the remaining portion of said base surface and forming with it a space larger than said space defined by said fixed cover and said base surface and a terminal box housed within the space defined by said removable cover and said base surface.

* * * * *